United States Patent
Manadhata et al.

(10) Patent No.: US 11,049,026 B2
(45) Date of Patent: Jun. 29, 2021

(54) UPDATING GROUND TRUTH DATA IN A SECURITY MANAGEMENT PLATFORM

(71) Applicant: HEWLETT PACKARD ENTERPRISE DEVELOPMENT LP, Houston, TX (US)

(72) Inventors: Pratyusa K. Manadhata, Princeton, NJ (US); Sandeep Bhatt, Princeton, NJ (US); Tomas Sander, Princeton, NJ (US)

(73) Assignee: Micro Focus LLC, Santa Clara, CA (US)

( * ) Notice: Subject to any disclaimer, the term of this patent is extended or adjusted under 35 U.S.C. 154(b) by 490 days.

(21) Appl. No.: 15/463,562

(22) Filed: Mar. 20, 2017

(65) Prior Publication Data
US 2018/0268304 A1    Sep. 20, 2018

(51) Int. Cl.
*G06N 5/04*     (2006.01)
*G06F 21/56*    (2013.01)
*G06F 21/57*    (2013.01)

(52) U.S. Cl.
CPC .............. *G06N 5/04* (2013.01); *G06F 21/566* (2013.01); *G06F 21/57* (2013.01); *G06F 2221/034* (2013.01)

(58) Field of Classification Search
CPC ......... G06N 5/04; G06F 21/566; G06F 21/57; G06F 2221/034
See application file for complete search history.

(56) References Cited

U.S. PATENT DOCUMENTS

| | | | |
|---|---|---|---|
| 9,032,521 B2 | 5/2015 | Amini et al. | |
| 9,306,965 B1 | 4/2016 | Grossman et al. | |
| 9,413,781 B2 | 8/2016 | Cunningham et al. | |
| 2008/0184371 A1* | 7/2008 | Moskovitch | G06F 21/566 726/24 |
| 2012/0263376 A1* | 10/2012 | Wang | G06K 9/6256 382/160 |
| 2015/0295945 A1* | 10/2015 | Canzanese, Jr. | G06F 9/45545 726/23 |
| 2015/0373043 A1 | 12/2015 | Wang et al. | |

(Continued)

OTHER PUBLICATIONS

Saritha Auti, "Security Analytics & Intelligence for Critical Infrastructure," 2014, pp. 1-12, WIPRO Ltd., Available at: <wipro.com/documents/security-analytics-and-intelligence-for-critical-infrastructure.pdf>.

(Continued)

*Primary Examiner* — Jeffrey D. Popham

(57) ABSTRACT

Updating ground truth data in a security management platform is disclosed. One example is a system including at least one processor and a memory storing instructions executable by the at least one processor to receive, in a security management platform, event data relating to a plurality of events corresponding to operation of a computing arrangement in a current time interval, and computing ground truth data for the current time interval based on the received event data, and threat intelligence data from time intervals preceding the current time interval. A prediction model is applied to generate predictions for the current time interval based on the received event data. Ground truth data is re-computed for the time intervals preceding the current time interval based on a comparison of the generated predictions and the computed ground truth data.

19 Claims, 4 Drawing Sheets

(56) References Cited

U.S. PATENT DOCUMENTS

| | | | |
|---|---|---|---|
| 2016/0042179 A1* | 2/2016 | Weingarten | G06F 21/566 |
| | | | 726/23 |
| 2016/0065610 A1 | 3/2016 | Peteroy et al. | |
| 2016/0191559 A1* | 6/2016 | Mhatre | H04L 63/1416 |
| | | | 726/23 |
| 2016/0269434 A1 | 9/2016 | DiValentin et al. | |
| 2016/0381042 A1* | 12/2016 | Zhang | H04L 63/145 |
| | | | 726/24 |

OTHER PUBLICATIONS

Tom Hogue et al., "Secure Data Center for Enterprise—Threat Management with Nextgen IPS," Aug. 26, 2014, pp. 1-70, Cisco, Available at: <cisco.com/c/dam/en/us/solutions/collateral/enterprise/design-zone-secure-data-center-portfolio/threat-mgmt-ips.pdf>.

* cited by examiner

UPDATING GROUND TRUTH DATA IN A SECURITY MANAGEMENT PLATFORM

BACKGROUND

Computers and other devices in a computing arrangement may be subject to unauthorized access or attack. Unauthorized access may be performed by users or programs. Attacks may include attacks by malware, denial-of-service attacks, and so forth. Other anomalies or issues may also exist in a computing arrangement.

BRIEF DESCRIPTION OF THE DRAWINGS

Some implementations of the present disclosure are described with respect to the following figures.

DETAILED DESCRIPTION

Figure 1:
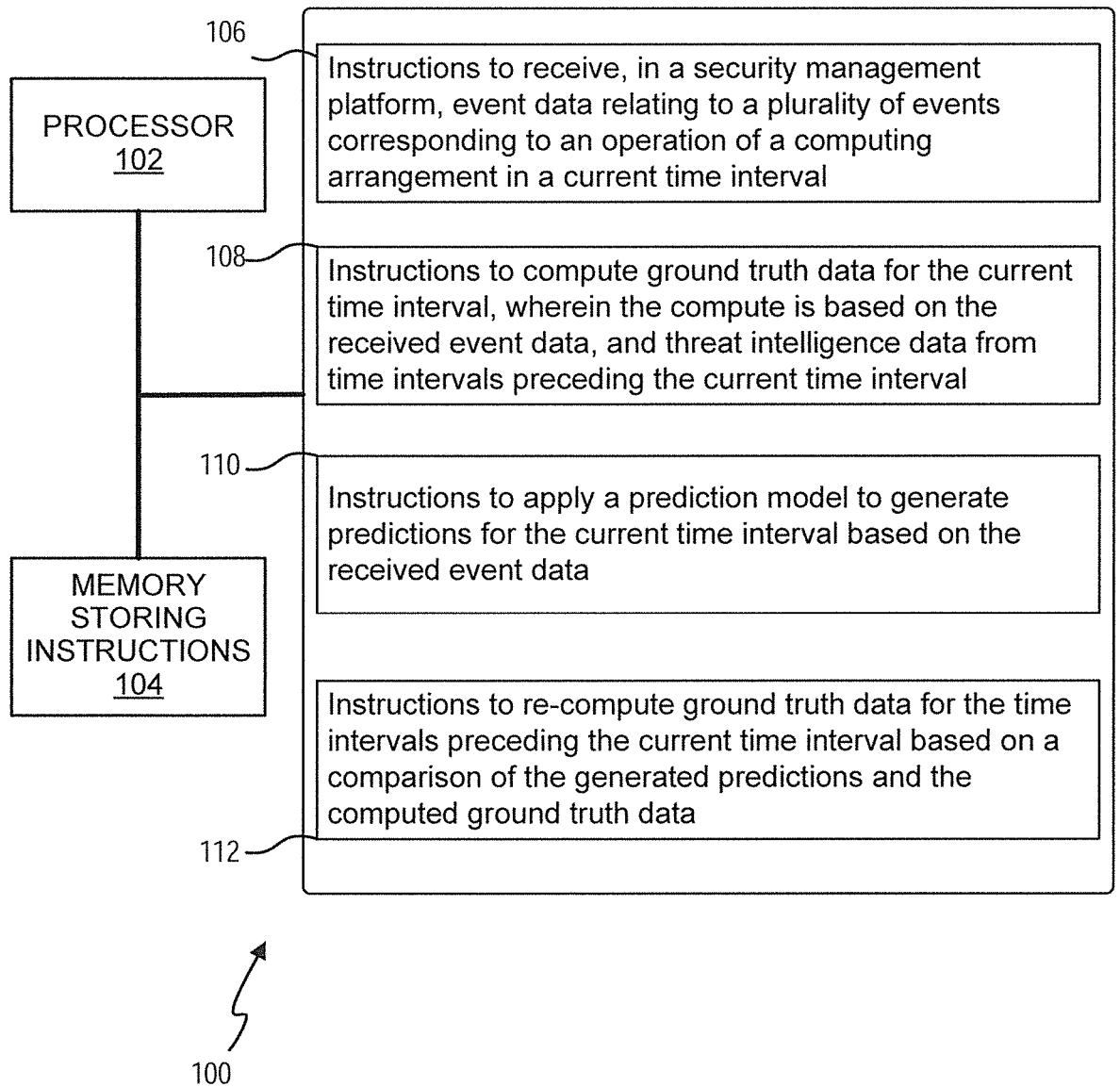
FIG. 1 is a block diagram illustrating one example of a system for updating ground truth data in a security management platform.

Security issues in a computing arrangement may relate to any or some combination of activities such as, for example, unauthorized access of data, a program, or machine in the computing arrangement; an attack on the computing arrangement that is intended to cause damage or errors in components of the computing arrangement; an action that violates a specified policy, government regulation, or standards specification; fault or error during operation of a program or machine; or any other activity that can compromise the security or operational integrity of the computing arrangement. The foregoing activities can occur as a result of a user performing an unauthorized login or access of the computing arrangement, either from within a boundary of the computing arrangement or from outside the boundary of the computing arrangement, execution of malware (e.g., viruses, adware, spyware, etc.) in the computing arrangement, denial-of-service (DoS) attacks, malfunctioning programs or machines, or other activities.

A "computing arrangement" can refer to any arrangement that includes any or some combination of the following, whether at one geographic location or at multiple geographic locations: a computer (or alternatively, multiple computers), a communication node (or alternatively, multiple communication nodes), a storage device (or alternatively, multiple storage devices), a printer (or multiple printers), a server (or multiple servers), and other electronic devices. A "boundary" of the computing arrangement can be provided by systems at the edge of a network that allow electronic devices in the computing arrangement to communicate with external devices. For example, such edge systems can include any or some combination of the following: firewalls, gateways, network address translators, routers, switches, and so forth.

An enterprise can establish a security management platform such as a security operation center (SOC) to protect the computing arrangement from security issues. An enterprise can refer to a business concern, a government agency, an educational organization, or any other entity that has a computing arrangement.

An SOC can refer to any entity (such as a department, a division, or any other organizational unit) that is responsible for protecting the computing arrangement in response to security issues. In an SOC, analysts may monitor for alerts relating to security issues in the computing arrangement, and in response to the alerts, can take actions to address the security issues.

The quality of detection of security issues, on which the alerts are based, is directly impacted by the quality of the prediction models upon which the prediction models are based. Also, threat intelligence data has a temporal aspect to it since security issues develop over time. The term threat intelligence, as used herein, generally refers to organized and analyzed information about past, current, or potential attacks that may threaten an entity in the computing arrangement. As threat intelligence data is updated over time, prediction models need to be adjusted as well. Accordingly, there is a need to continuously validate and calibrate prediction models to enhance their ability to detect malicious behavior.

In some examples, a lack of ground truth data may be detrimental to effective validation of prediction models. Generally, ground truth data refers to knowledge about states of entities in a computing arrangement. Consider a prediction model that detects compromised user accounts. In order to compute the module's performance metrics and validate the module, there is a need to obtain ground truth data related to user accounts. In other words, there is a need to know which accounts may be compromised and which may not. Based on such data, the module's predictions may be compared with ground truth data to determine the module's effectiveness. Accordingly, there is a need to utilize currently available ground truth data to update ground truth data collected in the past so as to continuously validate prediction models over time.

As described in various examples herein, updating ground truth data in a security management platform is disclosed. One example is a system including at least one processor and a memory storing instructions executable by the at least one processor to receive, in a security management platform, event data relating to a plurality of events corresponding to operation of a computing arrangement in a current time interval, and computing ground truth data for the current time interval based on the received event data, and threat intelligence data from time intervals preceding the current time interval. A prediction model is applied to generate predictions for the current time interval based on the received event data. Ground truth data is re-computed for the time intervals preceding the current time interval based on a comparison of the generated predictions and the computed ground truth data.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for updating ground truth data in a security management platform. System 100 is shown to include a processor 102, and a memory 104 storing instructions 106-112 to perform various functions of the system.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, including a network of cloud computing resources, and may include any number of hubs, routers, switches, cell towers, and so forth. Such a network may be, for example, part of a cellular network, part of the internet, part of an intranet, and/or any other type of network.

Memory 104 may store instructions 106 to receive, in a security management platform, event data relating to a plurality of events corresponding to an operation of a computing arrangement in a current time interval. Time may be divided into time periods, e.g., 4 hours. For ease of description, we may use $T_i$ to denote the ith time period, and $T_0$ to denote the beginning of time. Accordingly, event data received during the ith time period $T_i$ may be denoted by $E_i$.

A security management platform is generally a security information and event management system which includes an event data collector to collect data relating to events associated with the various electronic devices of the computing arrangement. For example, events may include login events, events relating to loading of programs, events relating to execution of programs, events relating to accesses made of components of the computing arrangement, errors reported by machines or programs, events relating to performance monitoring of various characteristics of the computing arrangement, including monitoring of network communication speeds, execution speeds of programs, and so forth.

Event data collected by the event data collector may include attributes associated with each event, where attributes may include any or some combination of the following: an entity (machine or program) associated with the event (e.g., the entity that triggered the event, the entity on which an activity was occurring when the event occurred, etc.), a type of operating system associated with the event, a type of application program associated with the event, a network address associated with the event, and so forth.

In some examples, event data may include vulnerability data. For example, organizations may use various tools to scan, record, and track vulnerabilities in systems, network, and applications that are deployed. These vulnerabilities may include issues with improper configurations, usage of a known vulnerable library, or incorrect rendering of images from a CCTV. Data from risk and compliance assessments such as archive records may also be included in vulnerability data.

In some examples, event data may include device data, such as raw data, configurations, and logs from various devices connected to the network that may provide insight into a variety of issues. These devices could represent endpoint hosts with user accounts, firewalls, intrusion prevention systems, routers, and others.

In some examples, event data may include traffic data representative of all data that is in motion within an organization's network. When data transmitted through various protocols are aggregated together, many hidden patterns and behaviors may be revealed through proper analysis.

In some examples, event data may include asset enrichment data that may improve the quality and variety of data associated with the assets. Examples may include an extensive network map of the organization's connectivity, details of a subnet or asset's usage, costs associated with assets, context of an application, and others.

In some examples, event data may include organization enrichment data that may provide details about users, geo-location of departments or users, permissions, and others. Such data may be acquired from the organization's human resources (HR) system and may provide context to various activities observed from other data feeds.

Memory 104 may store instructions 108 to compute ground truth data for the current time interval, where the compute is based on the received event data, and threat intelligence data from time intervals preceding the current time interval. The prediction model is generally designed to make predictions about existing or potential security threats based on the received event data. The prediction model may be learnt or derived from the received event data, and may generally change over time. The model may predict, for example, a set of infected devices, a set of compromised users, a set of malicious domains and external IP addresses, and so forth. The prediction model is generally included in an analytics module, and the analytics module is based on the prediction model. The analytics module generally focuses on a specific type of threat detection using a specific technology. For example, the analytics module may use time series analysis to detect infected machines.

A prediction model may be a model such as a decision tree or a random forest (a collection trees created from randomly chosen subset of attributes) learnt from the event data using, for example, machine learning and/or statistical techniques. A prediction model may also be a collection of entity profiles computed from event data received in time intervals preceding the current time interval, and used for statistical anomaly detection.

In some examples, $M_i$ may denote the prediction model during a current time period $T_i$ that is derived from the event data $E_j$ (j<i) collected in a time period $T_j$ before the current time period $T_i$. The specifics of model generation are generally dependent on the type of analytics module that is relevant to a particular threat detection environment. As described herein, the prediction model $M_i$ used during the time period $T_i$ is generated from event data collected in one or more time intervals $T_j$ preceding the current time interval $T_i$. For example, $M_5$ may be generated from event data $E_2$ and $E_3$ collected at preceding time intervals $T_2$ and $T_3$, respectively. The prediction model $M_5$ may be used for prediction at time intervals $T_4$ and $T_5$, and subsequent time intervals until a new model is generated. For example, the same model may be used until time interval $T_6$ and a new model may be trained at time interval $T_7$. In such a case, the prediction model remains unchanged, and $M_4=M_5=M_6$, but these are different from $M_7$. In addition to event data, a model generation process may also use threat intelligence (TI) gathered in previous time periods, i.e., $TI_2$ and $TI_3$. It may be noted that the techniques described herein are generally independent of the specifics of model generation.

Memory 104 may store instructions 110 to apply a prediction model to generate predictions for the current time interval based on the received event data. For example, at the time period $T_i$, the generated prediction model $M_i$ may be applied on the event data $E_i$ collected during $T_i$ to detect threats and make predictions. Ground truth data, as used herein, generally refers to a reliable identification of malicious activity or lack thereof in a given time interval. The ground truth data $GT_i$, for the current time interval $T_i$ may be computed based on the event data $E_i$ received in the current time interval $T_i$, as well as the threat intelligence information collected in time intervals preceding the current time interval, as long as the information is still valid. In other words, $GT_i=f(TI_0, TI_1, \ldots, TI_i)$, where the specifics of f depends on the generated prediction model $M_i$.

For example, to identify infected machines inside an enterprise, information about blacklisted IP addresses and domain names may be utilized. If a machine in the computing arrangement contacts more than a threshold number of blacklisted external entities in a given time interval, then the machine may be added to the ground truth set of infected machines. In addition, threat intelligence information may be weighted based on, for example, a relevance of the source of information. In some examples, the function f and the weights may be learned in several ways from historical data. One approach may be to use machine learning over historical threat intelligence data and then to augment/update the findings based on expert user feedback.

In some examples, the instructions 110 to compute the ground truth data include instructions to generate threat intelligence data for the current time interval, where the threat intelligence data includes observables associated with malicious activities detected based on the computed ground truth data. Some example observables include external IP addresses, domain names, URLs, email addresses, file hashes, mutexes, and AS numbers.

Memory 104 may store instructions 112 to re-compute ground truth data for the time intervals preceding the current time interval based on a comparison of the generated predictions and the computed ground truth data. Generally, threat intelligence data has a temporal aspect to it. That is, the threat intelligence data $TI_i$ collected and/or generated during the time interval $T_i$ may include information relevant to time intervals preceding the time interval $T_i$. For example, an external domain included in a blacklist in the ground truth data $GT_i$ for the current time interval $T_i$ may have been accessed by a machine inside an enterprise during an earlier time interval $T_j$, $j<i$. Accordingly, although the machine did not belong to $GT_j$ computed during $T_j$, where $j<i$, the machine belongs to the ground truth data $GT_j$ for the time interval $T_j$ based on the knowledge available during the current time interval $T_i$. System 100 compares the generated predictions and the computed ground truth data to determine that the ground truth may have changed for at least one of the preceding time intervals. Accordingly, during the current time interval $T_i$, the ground truth data $GT_j$ may be re-computed for all time intervals $T_j$, where $j<i$, that precede the current time interval $T_i$.

In some examples, the instructions 112 to re-compute the ground truth data include instructions to generate threat intelligence data for the current time interval, where the threat intelligence data includes observables associated with malicious activities detected by the prediction model. As described herein, threat intelligence data has a temporal aspect to it. In some examples, the instructions 112 to re-compute the ground truth data include instructions to re-train, for the time intervals preceding the current time interval, prediction models that depend on the re-computed ground truth data. In other words, the prediction models are iteratively adjusted to be aligned with the updated ground truth data and/or threat intelligence data so as to generate more accurate predictions. One way to determine accuracy of a prediction model is to compute a validation metric for the prediction model.

In some examples, the instructions 112 to re-compute the ground truth data include instructions to re-compute validation metrics for prediction models in the time intervals preceding the current time interval based on the re-computed ground truth data. A validation metric is a performance metric that provides a measure of accuracy for the prediction model. Examples of validation metrics may include standard metrics such as precision, recall, false positive rates, and false negative rates, and so forth. In order to compute validation metrics at a time interval $T_i$, the ground truth information relevant to the prediction model is determined. For simplicity, if the prediction model detects infected machines at time $T_i$, then module's performance metric is computed based on the ground truth data $GT_i$ at $T_i$. In other words, a reliable identification of infected machines in the time period $T_i$ is utilized to compute validation metrics at the time interval $T_i$.

Generally, when the ground truth data is re-computed, the validation metrics in the time intervals $T_0$ to $T_i$ may be recomputed as well. In other words, in every time interval, the validation metrics may be re-computed for all time intervals preceding the current time interval, and a continuous and reliable validation for prediction models may be achieved.

As described herein, based on the prediction model, the prediction model $M_i$ may predict malicious activity, including, for example, a set of infected devices, a set of compromised users, a set of malicious domains and external IP addresses, and so forth. The set of predictions made during the time period $T_i$ may be denoted by $P_i$. A true positive (TP) generally refers to entities in $P_i$ that are in $GT_i$. A true negative (TN) generally refers to entities not in $P_i$ that are also not in $GT_i$. A false positive (FP) generally refers to entities in $P_i$ that are not in $GT_i$. A false negative (FN) generally refers to entities not in $P_i$ that are in $GT_i$.

Precision may be measured as a fraction of entities in $P_i$ that are truly anomalous, and recall is a fraction of entities in $GT_i$ that are present in $P_i$. A false positive rate (FPR) is indicative of a fraction of entities that are incorrectly identified as associated with malicious activity. The FPR may be determined as a fraction of benign entities (not in $GT_i$) that are present in $P_i$. Mathematically, this may be expressed as:

$$FPR = \frac{FP*100}{FP+TN} \quad \text{(Eqn. 1)}$$

A true positive rate (TPR) is indicative of a fraction of entities that are correctly identified as associated with malicious activity. The TPR may be determined as a fraction of entities in $GT_i$ that are also present in Pi. Mathematically, this may be expressed as:

$$TPR = \frac{TP*100}{TP+FN} \quad \text{(Eqn. 2)}$$

A false negative rate (FNR) is indicative of a fraction of entities that are incorrectly identified as not associated with malicious activity. The FNR may be determined as a fraction of entities in $GT_i$ that are not in Pi. Mathematically, this may be expressed as:

$$FNR = \frac{FN*100}{FN+TP} \quad \text{(Eqn. 3)}$$

A true negative rate (TNR) is indicative of a fraction of entities that are correctly identified as not associated with malicious activity. The TNR may be determined as a fraction of entities not in $GT_i$ that are also not in Pi. Mathematically, this may be expressed as:

$$TNR = \frac{TN*100}{TN+FP} \quad \text{(Eqn. 4)}$$

In some examples, the validation metric for the prediction model is based on factors including weighted false positives, weighted true positives, weighted false negatives, or weighted true negatives. For example, non-weighted validation metrics count each prediction the same, i.e., every false positive is weighted equal and every false negative is weighted equal. However, in enterprise settings, different errors may have different costs. For example, failing to detect a compromised admin account may be more harmful than failing to detect a compromised local user account. Similarly, failing to detect infected executive devices containing sensitive information may be more harmful than failing to detect an infected development machine.

Accordingly, weights may be associated with false positives, true positives, false negatives, and true negatives to compute weighted validation metrics $V_i$, and then the weighted metrics may be utilized in computing continuous validation metrics. For example, different weights may be assigned to different threat intelligence information from a single threat intelligence source depending on their relevance. In some examples, different weights may be assigned to threat intelligence information collected from different sources depending on the source's reliability over time. Such weighted threat intelligence data may be utilized to compute weighted versions of the FPR, TPR, FNR and TNR as described herein.

In some examples, the instructions to re-compute the validation metrics further include instructions to determine a time to detection for the prediction model, where the time to detection is an average time elapsed between an appearance of an entity in the computed ground truth data and a first identification of the entity as being anomalous by the prediction model. Generally, a smaller value for the time to detection is indicative of a higher performance rating for the prediction model, whereas a higher value for the time to detection is indicative of a lower performance rating for the prediction model.

In some examples, the instructions to re-compute the validation metrics further include instructions to compute an aggregate of the re-computed validation metrics. For example, validation metrics computed at any time interval $T_i$, may be aggregated to an overall set of validation metrics, V. At any time, V may be indicative of a health of a prediction model. One way to compute V may be to average the $V_i$'s computed. For example, if $T_n$ is the current time period, then an aggregate validation metric V of the re-computed validation metrics $V_0, V_1, \ldots, V_n$, may be determined as:

$$V = \frac{V_0 + V_1 + \ldots + V_n}{n} \quad \text{(Eqn. 5)}$$

More precisely, an aggregate False Positive Rate, FPR, of the re-computed FPRs, $FPR_0, FPR_1, \ldots, FPR_n$, may be determined as:

$$FPR = \frac{FPR_0 + FPR_1 + \ldots + FPR_n}{n} \quad \text{(Eqn. 6)}$$

Other validation metrics may be aggregated in like manner.

In some examples, the aggregate of the re-computed validation metrics is a weighted average of the re-computed validation metrics, where a weight associated with a validation metric for an earlier time interval is less than a weight associated with a validation metric for a later time interval. Generally, recent performance may be a better predictor of future performance than performance a long time ago. Accordingly, different weights may be assigned to past prediction. For example, weights $w_0, w_1, \ldots, w_n$ may be associated with validation metrics $V_0, V_1, \ldots, V_n$ for time intervals $T_0, T_1, \ldots, T_n$. Accordingly, a weighted aggregate of the re-computed validation metrics may be determined as:

$$V = \frac{w_0 V_0 + w_1 V_1 + \ldots + w_n V_n}{n} \quad \text{(Eqn. 7)}$$

In some examples, the weights $w_0, w_1, \ldots, w_n$ may be monotonically increasing. In some examples, there may be an exponential decay of weights with lapsed time. For example, $w_i = 2^{(i-n)}$, for I=0, 1, . . . , n. In some examples, the weights may be determined by a security expert based on domain knowledge and expertise. Also, for example, weighted validation metrics described herein may be utilized to compute an aggregate weighted validation metric.

In some examples, memory 104 may store instructions to re-train, for the time intervals preceding the current time interval, prediction models that depend on the re-computed ground truth data. In some examples, memory 104 may store instructions to generate updated predictions based on the re-trained prediction models.

In some examples, the instructions 112 to re-compute the ground truth data include instructions to not trigger the re-compute if a trigger policy is not satisfied. Continuous validation comes with a storage and performance cost. Accordingly, there may be several policies in place in order to decide when to re-compute ground truth and to retrain the associated models. In some examples, the trigger policy includes if an amount of the generated threat intelligence data for the current time interval exceeds a first threshold. For example, the ground truth data is re-computed when new threat intelligence data is more than a desired threshold.

Also, for example, the trigger policy includes if a prediction error rate for the prediction model exceeds a second threshold. Accordingly, the prediction model is updated when the prediction error rate improves over time as new data is received. Also, for example, the prediction model is updated if a prediction error rate trends higher over time. As another example, the trigger policy includes if a time to detection for the prediction model exceeds a third threshold. For example, the ground truth data is re-computed or the prediction model is updated when the time to detection reduces.

Figure 2:
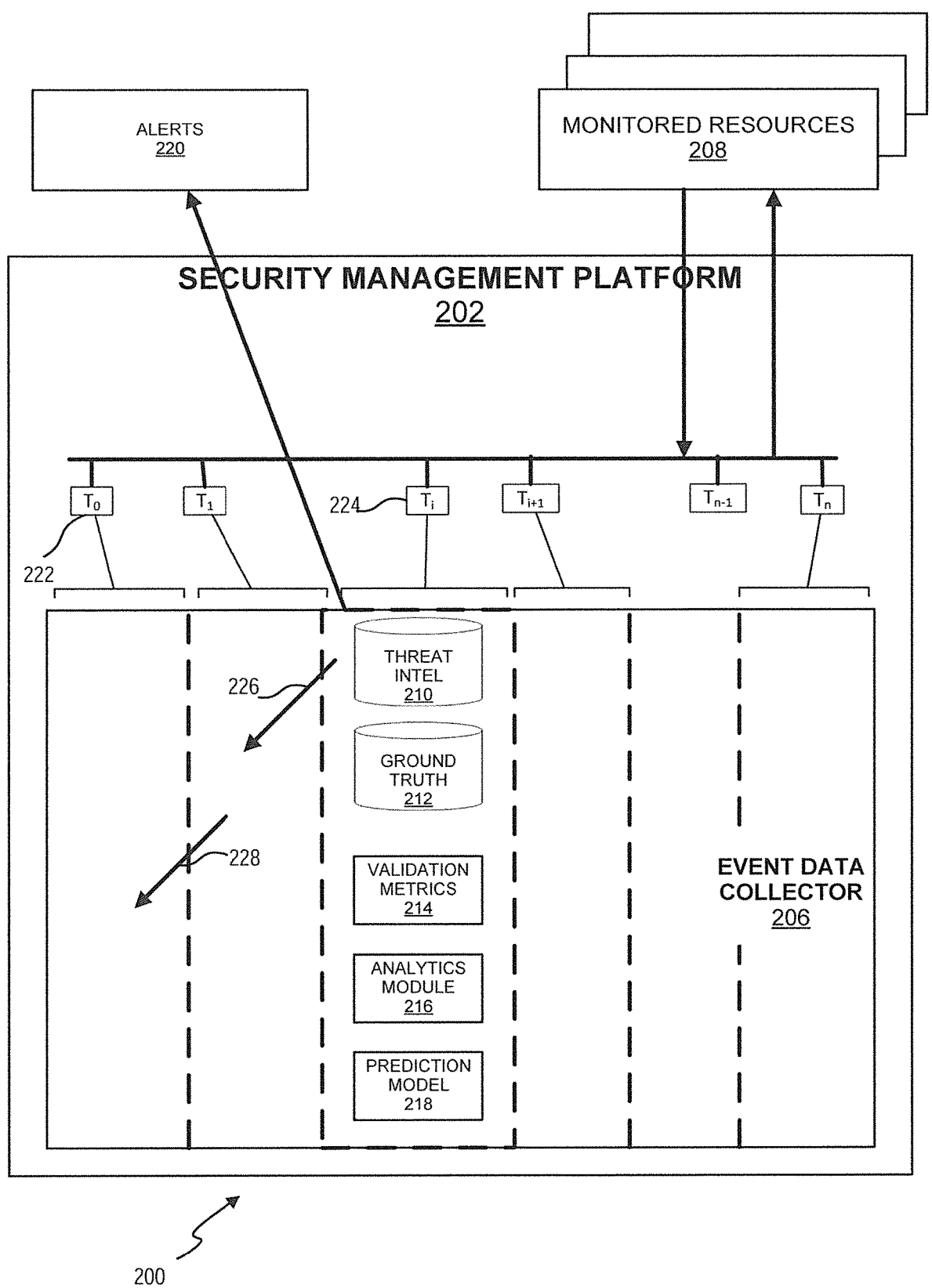
FIG. 2 is a block diagram illustrating another example of a system for updating ground truth data in a security management platform.

FIG. 2 is a functional block diagram illustrating another example of a system 200 for updating ground truth data in a security management platform 202. System 200 described with reference to FIG. 2 may share some aspects of system 100 as described with reference to FIG. 1.

System 200 includes monitored resources 208 that comprise a computing arrangement, and is communicatively linked to the security management platform 202 (such as a security information and event management (SIEM) system). The security management platform 202 generally refers to an infrastructure, made up of hardware equipment and machine-readable instructions (software and/or firmware), that is able to collect data relating to events in the monitored resources 208. Such event data may be received by the event data collector 206. Prediction model 218 in the security management platform 202 generates security alerts 220 in response to the collected event data.

Various time intervals $T_0, T_1, \ldots, T_n$ are illustrated. For example, $T_0$ may denote a starting time interval 222, whereas $T_i$ may denote a current time interval 224. Event data relating to a plurality of events corresponding to operation of monitored resources 208 may be received by the event data collector. The received event data may be associated with time intervals $T_j$, where j<i, and corresponding to time intervals preceding the current time interval $T_i$ 224.

The prediction model 218 may be trained based on the received event data. The generated prediction model 218 may be applied to generate predictions or alerts 220 for the current time interval 224. Also, for example, threat intelligence data 210 may be generated for the current time interval $T_i$ 224, where the threat intelligence data 210 includes observables associated with malicious activities detected by the trained prediction model 218. Also, ground truth data 212 may be computed for the current time interval 224, where the computation is based on the received event data, and threat intelligence data from time intervals preceding the current time interval. The computed ground truth data 212 for the current time interval 224 may be compared with the generated predictions to identify any updates to ground truth data or threat intelligence data for time intervals preceding the current time interval. The ground truth data for the time intervals preceding the current time interval may be re-computed based on such comparison.

A validation metric 214 may be computed for the prediction model 218. The validation metric 214 may be utilized to determine when to retrain the analytics module 216 (e.g., when the error rates in a few consecutive time periods go beyond a threshold) and when to retire the analytics module 216 (e.g., when the detection rate is too low, or when the error rates are too high, or a combination of both). In some examples, the validation metric 214 may be utilized to determine when to retrain the prediction model 218.

As indicated by arrows 226 and 228, continuous validation of the prediction model 218 is illustrated. For example, threat intelligence data for the time intervals preceding the current time interval 224 may be updated based on the generated threat intelligence data 210 for the current time interval 224. Also, for example, prediction models for the time intervals preceding the current time interval that depend on the updated threat intelligence data may be updated. Accordingly, predictions in the previous time periods may be updated using the updated models. Consequently, updated alerts 220 may be generated as well.

As another example of continuous validation, validation metrics for prediction models in the time intervals preceding the current time interval 224 may be re-computed based on the updated threat intelligence data. Also, for example, validation metrics for prediction models in the time intervals preceding the current time interval 224 may be re-computed based on the re-computed ground truth data. Based on such re-computation, a weighted aggregate of the re-computed validation metrics may be computed, where a weight associated with a validation metric for an earlier time interval is less than a weight associated with a validation metric for a later time interval.

Generally, the components of system 100 or system 200 may include programming and/or physical networks to be communicatively linked to other components of each respective system. In some instances, the components of each system may include a processor and a memory, while programming code is stored and on that memory and executable by a processor to perform designated functions.

Generally, the system components may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 3:
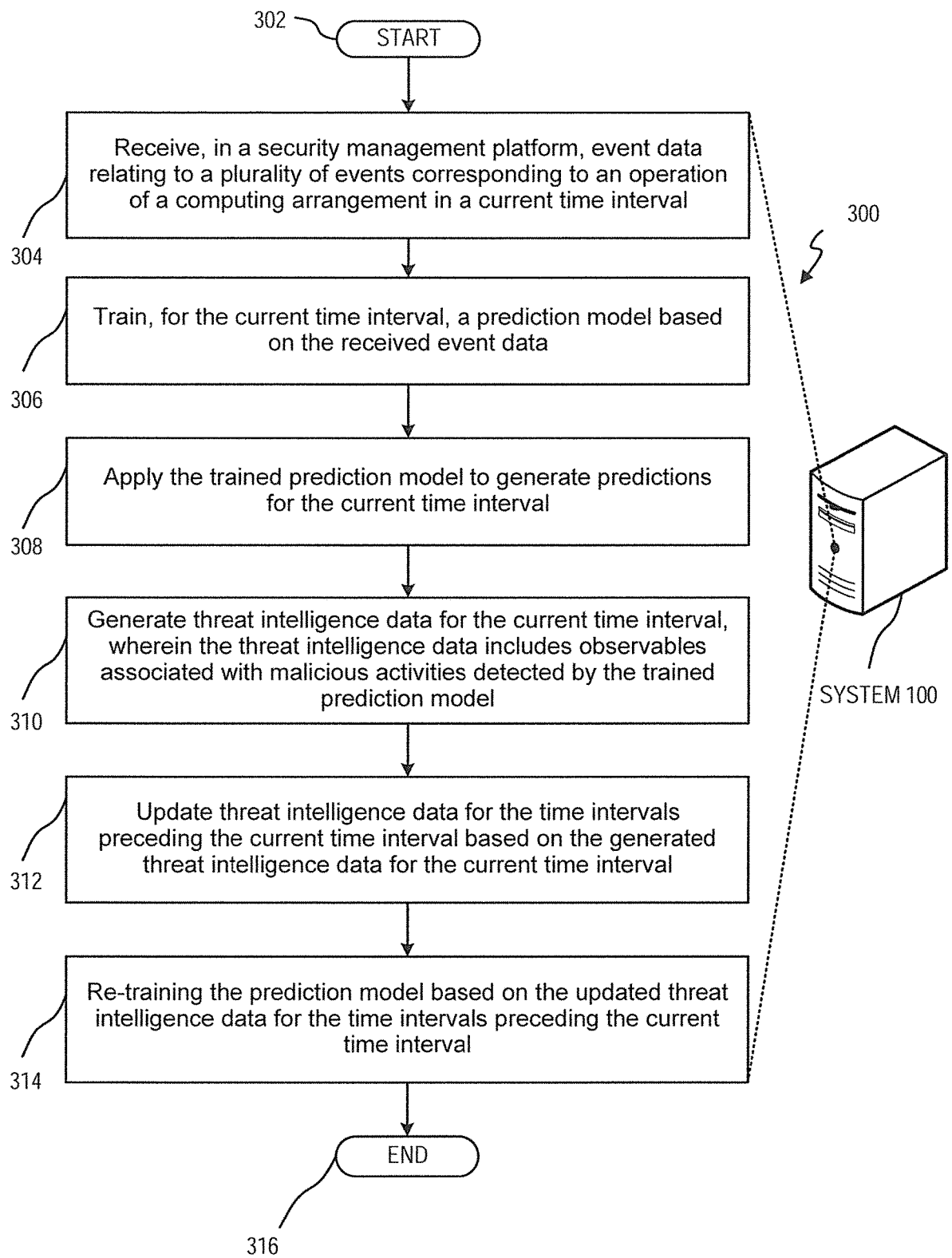
FIG. 3 is a flow diagram illustrating one example of a method for updating ground truth data in a security management platform.

FIG. 3 is a flow diagram illustrating one example of a method for updating ground truth data in a security management platform. In some examples, such an example method may be implemented by a system such as, for example, system 100 of FIG. 1, and/or system 200 of FIG. 2. The method 300 may begin at block 302, and continue to end at block 316.

At 304, event data relating to a plurality of events corresponding to operation of a computing arrangement in a current time interval may be received.

At 306, a prediction model may be trained for the current time interval based on the received event data.

At 308, the trained prediction model may be applied to generate predictions for the current time interval.

At 310, threat intelligence data for the current time interval may be generated, where the threat intelligence data includes observables associated with malicious activities detected by the trained prediction model.

At 312, threat intelligence data for the time intervals preceding the current time interval may be updated based on the generated threat intelligence data for the current time interval.

At 314, the prediction model may be re-trained based on the updated threat intelligence data for the time intervals preceding the current time interval.

As described herein, in some examples relevant ground truth data for the current time interval.

In some examples, the method may include determining a time to detection for the prediction model, wherein the time to detection is an average time elapsed between an appearance of an entity in the computed ground truth data and a first identification of the entity as being anomalous by the prediction model.

In some examples, the method may include re-training, for the time intervals preceding the current time interval, prediction models that depend on the updated threat intelligence data.

In some examples, the method may include re-computing validation metrics for prediction models in the time intervals preceding the current time interval based on the updated threat intelligence data. In some examples, the method may further include computing an aggregate of the re-computed validation metrics.

Figure 4:
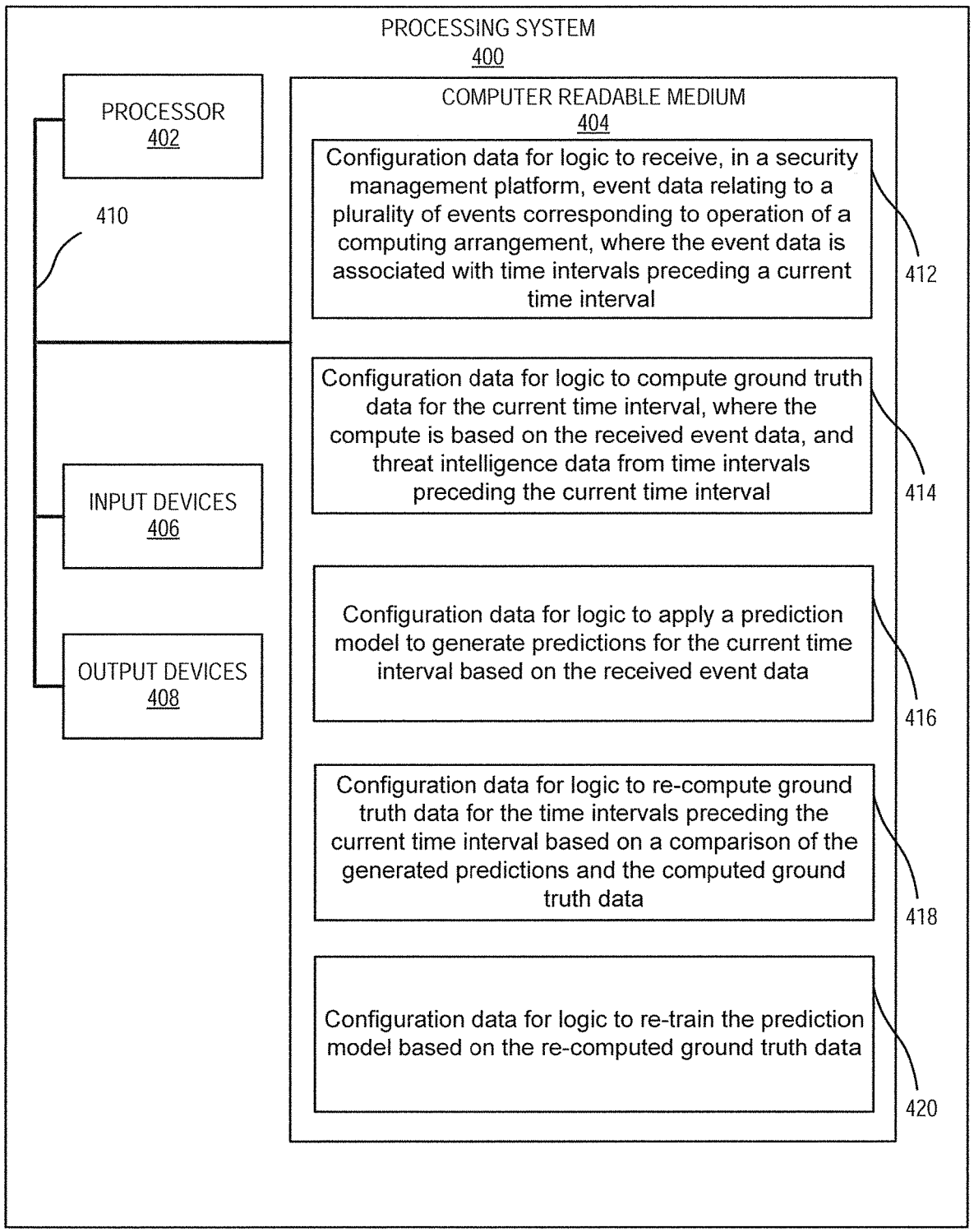
FIG. 4 is a block diagram illustrating one example of a computer readable medium for updating ground truth data in a security management platform.

FIG. 4 is a block diagram illustrating one example of a computer readable medium for updating ground truth data in a security management platform. Processing system 400 includes a processor 402, a computer readable medium 404, input devices 406, and output devices 408. Processor 402, computer readable medium 404, input devices 406, and output devices 408 are coupled to each other through a communication link (e.g., a bus). In some examples, the non-transitory, computer readable medium 404 may store configuration data for the logic to perform the various functions of the processor 402.

Processor 402 executes instructions included in the computer readable medium 404 that stores configuration data for logic to perform the various functions. Computer readable medium 404 stores configuration data for logic 412 to receive, in a security management platform, event data relating to a plurality of events corresponding to operation of a computing arrangement, where the event data is associated with time intervals preceding a current time interval.

Computer readable medium 404 stores configuration data for logic 414 to compute ground truth data for the current time interval, where the compute is based on the received event data, and threat intelligence data from time intervals preceding the current time interval.

Computer readable medium 404 stores configuration data for logic 416 to apply a prediction model to generate predictions for the current time interval based on the received event data.

Computer readable medium 404 stores configuration data for logic 418 to re-compute ground truth data for the time intervals preceding the current time interval based on a comparison of the generated predictions and the computed ground truth data.

Computer readable medium 404 stores configuration data for logic 420 to re-train the prediction model based on the re-computed ground truth data.

In some examples, computer readable medium 404 includes instructions to compute a validation metric for the re-trained prediction model.

In some examples, computer readable medium 404 includes instructions to re-compute validation metrics for prediction models in the time intervals preceding the current time interval based on the re-computed ground truth data, and compute a weighted aggregate of the re-computed validation metrics, wherein a weight associated with a validation metric for an earlier time interval is less than a weight associated with a validation metric for a later time interval.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 404 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage containers.

As described herein, various components of the processing system 400 are identified and refer to a combination of hardware and programming to perform a designated visualization function. As illustrated in FIG. 2, the programming may be processor executable instructions stored on tangible computer readable medium 404, and the hardware may include Processor 402 for executing those instructions. Thus, computer readable medium 404 may store program instructions that, when executed by Processor 402, implement the various components of the processing system 400.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 404 may be any of a number of memory components capable of storing instructions that can be executed by processor 402. Computer readable medium 404 may be non-transitory in the sense that it does not encompass a transitory signal but instead is made up of memory components to store the relevant instructions. Computer readable medium 404 may be implemented in a single device or distributed across devices. Likewise, processor 402 represents any number of processors capable of executing instructions stored by computer readable medium 404. Processor 402 may be integrated in a single device or distributed across devices. Further, computer readable medium 404 may be fully or partially integrated in the same device as processor 402 (as illustrated), or it may be separate but accessible to that device and processor 402. In some examples, computer readable medium 404 may be a machine-readable storage medium.

The general techniques described herein provide a way for customers of a security management platform to detect the efficacy of a prediction model throughout the life of the prediction model. Also, for example, SOC analysts may be better equipped to determine how to utilize the output of a prediction model. Generally, an output from a prediction model with greater reliability may be given higher consideration and weight. Validation metrics for a prediction model may be utilized to determine how to use the anomaly detections used by the module in profile generation and alert generation.

Although specific examples have been illustrated and described herein, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A system comprising:
a hardware processor; and
a non-transitory storage medium storing instructions executable on the hardware processor to:
receive, in a security management platform, event data relating to a plurality of events corresponding to an operation of a computing arrangement in a current time interval;
compute ground truth data for the current time interval, wherein the ground truth data is based on the received event data, and threat intelligence data from a prior time interval preceding the current time interval;
apply a first prediction model to generate a prediction for the current time interval based on the received event data;

determine a time to detection for the first prediction model, wherein the time to detection includes a time elapsed between an appearance of an entity in the computed ground truth data and a first identification of the entity as being anomalous by the first prediction model;

in response to a trigger policy being satisfied based on a determination that the time to detection for the first prediction model is less than a time to detection for a second prediction model used for making a prediction in the prior time interval, re-compute ground truth data for the prior time interval based on a comparison of the generated prediction and the computed ground truth data, wherein the second prediction model is different from the first prediction model; and re-train, using the re-computed ground truth data, the second prediction model.

2. The system of claim 1, wherein the instructions are executable on the hardware processor to:

generate threat intelligence data for the current time interval, wherein the threat intelligence data for the current time interval includes observables associated with malicious activities detected by the first prediction model; and compute the ground truth data for the current time interval further based on the threat intelligence data for the current time interval.

3. The system of claim 1, wherein the instructions are executable on the hardware processor to update a prediction for the prior time interval using the re-trained second prediction model.

4. The system of claim 3, wherein the instructions are executable on the hardware processor to update an alert for the prior time interval based on the updated prediction.

5. The system of claim 1, wherein the trigger policy is satisfied further based on one or more of an amount of threat intelligence data for the current time interval exceeding a first threshold, a prediction error rate for the first prediction model exceeding a second threshold, or the prediction error rate for the first prediction model trending higher over time.

6. The system of claim 1, wherein the instructions are executable on the hardware processor to compute validation metrics for prediction models including the second prediction model in time intervals preceding the current time interval based on the re-computed ground truth data.

7. The system of claim 6, wherein a validation metric of the validation metrics is based on factors including weighted false positives, weighted true positives, weighted false negatives, or weighted true negatives.

8. The system of claim 6, wherein the instructions are executable on the hardware processor to compute an aggregate of the validation metrics to derive a validation metric for the first prediction model.

9. The system of claim 8, wherein the aggregate of the validation metrics for the prediction models in the time intervals preceding the current time interval is a weighted average of the validation metrics for the prediction models in the time intervals preceding the current time interval, wherein a weight associated with a validation metric for an earlier time interval is less than a weight associated with a validation metric for a later time interval.

10. The system of claim 6, wherein the instructions are executable on the hardware processor to use the validation metrics for determining when to re-train a prediction model of the prediction models.

11. The system of claim 1, wherein the time to detection for the second prediction model includes a time elapsed between an appearance of a given entity in the ground truth data for the prior time interval and a first identification of the given entity as being anomalous by the second prediction model in the prior time interval.

12. A method performed by a system comprising a hardware processor, comprising:

receiving, in a security management platform, event data relating to a plurality of events corresponding to an operation of a computing arrangement in a current time interval;

training, for the current time interval, a first prediction model based on the received event data;

computing ground truth data for the current time interval, wherein the ground truth data is based on the received event data and threat intelligence data from a prior time interval preceding the current time interval;

applying the trained first prediction model to generate a prediction for the current time interval;

determining a time to detection for the trained first prediction model, wherein the time to detection includes a time elapsed between an appearance of an entity in the computed ground truth data and a first identification of the entity as being anomalous by the trained first prediction model;

re-computing ground truth data for the prior time interval in response to a trigger policy being satisfied based on a determination that the time to detection for the trained first prediction model is less than a time to detection for a second prediction model used for making a prediction in the prior time interval, wherein the second prediction model is different from the first prediction model; and re-training, based on the re-computed ground truth data, the second prediction model.

13. The method of claim 12, further comprising applying the trained first prediction model to compute the ground truth data for the current time interval.

14. The method of claim 12, further comprising computing validation metrics for prediction models including the second prediction model in time intervals preceding the current time interval based on the re-computed ground truth data.

15. The method of claim 14, further comprising computing an aggregate of the validation metrics to derive a validation metric for the first prediction model.

16. The method of claim 12, wherein the time to detection for the second prediction model includes a time elapsed between an appearance of a given entity in the ground truth data for the prior time interval and a first identification of the given entity as being anomalous by the second prediction model in the prior time interval.

17. A non-transitory computer readable storage medium comprising instructions that upon execution cause a system to:

receive, in a security management platform, event data relating to a plurality of events corresponding to an operation of a computing arrangement;

compute ground truth data for a current time interval, wherein the ground truth data is based on the received event data and threat intelligence data from time intervals preceding the current time interval;

apply a first prediction model to generate a prediction for the current time interval based on the received event data;

determine a time to detection for the first prediction model, wherein the time to detection includes a time elapsed between an appearance of an entity in the computed ground truth data and a first identification of the entity as being anomalous by the first prediction model;

in response to a trigger policy being satisfied based on a determination that the time to detection for the first prediction model is less than a time to detection for a second prediction model used for making a prediction in a prior time interval preceding the current time interval, re-compute ground truth data for the prior time interval preceding the current time interval based on a comparison of the generated prediction and the computed ground truth data; and re-train, using the re-computed ground truth data, the second prediction model used for making the prediction in the prior time interval, the second prediction model being different from the first prediction model.

18. The non-transitory computer readable storage medium of claim 17, wherein the instructions upon execution cause the system to compute a validation metric for the second prediction model.

19. The non-transitory computer readable storage medium of claim 18, wherein the instructions upon execution cause the system to use the validation metric for determining when to re-train the second prediction model.

* * * * *